US010526683B2

(12) United States Patent
Carreño et al.

(10) Patent No.: US 10,526,683 B2
(45) Date of Patent: Jan. 7, 2020

(54) PROCESS FOR THE SELECTIVE RECOVERY OF LEAD AND SILVER

(71) Applicant: Técnicas Reunidas, S.A., Madrid (ES)

(72) Inventors: Carlos Alvarez Carreño, Madrid San Fernando de Henares (ES); Maite Pinedo González, Madrid San Fernando de Henares (ES); Emilio Pecharromán Mercado, Madrid San Fernando de Henares (ES); Nuria Ocaña García, Madrid San Fernando de Henares (ES); Maria Frades Tapia, Madrid San Fernando de Henares (ES)

(73) Assignee: Ténicas Reunidas, S.A., Madrid (ES)

( * ) Notice: Subject to any disclaimer, the term of this patent is extended or adjusted under 35 U.S.C. 154(b) by 870 days.

(21) Appl. No.: 15/024,691

(22) PCT Filed: Sep. 26, 2014

(86) PCT No.: PCT/EP2014/070630
§ 371 (c)(1),
(2) Date: Mar. 24, 2016

(87) PCT Pub. No.: WO2015/044353
PCT Pub. Date: Apr. 2, 2015

(65) Prior Publication Data
US 2016/0244862 A1 Aug. 25, 2016

(30) Foreign Application Priority Data

Sep. 27, 2013 (EP) ..................................... 13382373

(51) Int. Cl.
*C22B 7/00* (2006.01)
*C22B 3/00* (2006.01)

(52) U.S. Cl.
CPC ............ *C22B 7/006* (2013.01); *C22B 11/042* (2013.01); *C22B 11/044* (2013.01); *C22B 13/045* (2013.01); *Y02P 10/214* (2015.11); *Y02P 10/234* (2015.11)

(58) Field of Classification Search
CPC ..... C22C 7/006; C22C 11/042; C22C 13/045; Y02P 10/234
See application file for complete search history.

(56) References Cited

U.S. PATENT DOCUMENTS 1,069,498 A 8/1913 Titus et al.
4,127,639 A * 11/1978 Piret .......................... C22B 7/02
423/42

FOREIGN PATENT DOCUMENTS

CN 102 433 445 5/2012
CN 102433445 * 5/2012
CN 102 719 668 10/2012
DE 30 22 749 1/1981
EP 0 042 702 B1 9/1984
EP 1 258 535 B1 8/2003
EP 1 361 296 B1 7/2006

OTHER PUBLICATIONS

Translation of CN 102433445, May 2, 2012.*
Conic, V.T. et al., "Bioleaching of Zn—Pb—Ag sulphidic concentrate," 15th International Research/Expert Conference—TMT, 681-684 (2011).
Díaz, G. et al., Emerging Applications of ZINCEX and PLACID Technologies, JOM, 30-31(2001).
Díaz, G. et al., ZINCEX and PLACID Technology Applications Up-date, IMPC, (2006).
Frías, C. et al., "A Clean-Lead Factory is Available for Lead-Acid Batteries Recycling by means of the 'Cleanlead Process,'" 135th Annual Meeting and Exhibition, TMS, (2006).
Frías, C. et al., Improving Polymetallic Ores Beneficiation by means of the Primalead Process, Hydrometallurgy, 6th International Symposium, (2008).
Frías, C. et al., Indirect Bioleaching, Biotechnology, International Mining, 50-51 (2007).
Frías, C. et al., Industrial Size "Placid" Electrowinning Cell, TMS Annual Meeting, (1997).
Frías, C. et al., Silver, gold and lead recovery from bioleaching residues using the PLINT process, Minerals Engineering, (2002).
Frías, C. et al., "The Plint Process: A reliable and Profitable Way for Lean-Acid Batteries Recycling," Proceedings of Global Symposium on Recycling Waste Treatment and Clean Technology, Madrid, (2004).
International Search Report corresponding to PCT/EP2014/070630, (dated Dec. 17, 2014).
Notification of Transmittal of International Report on Patentability corresponding to PCT/EP 2014/070630 (dated Jan. 7, 2016).
Raghavan et al., "Hydrometallurgical processing of lead-bearing materials for the recovery of lead and liver as lead concentrate and lead metal," Hydrometallurgy, vol. 58, No. 2:103-116 (Dec. 1, 2000).
Stanojević, D.D. et al.; Lead and Silver Extraction from Waste Cake from Hydromettalurgical Zinc Production, Journal of the Serbian Chemical Society, 73 (5), 585-593 (2008).
Díaz, G et al., "Lead-Acid Battery Recycling by the PLACID Process. A Global Approach" Conference Electrochemical Process—A clean alternative, Toulouse, (1995).
Díaz, G. et al., "Zinc Recycling through the Modified ZINCEX Process," 3rd International Symposium Recycling of Metals and Engineered Materials, 623-635 (1995).
Farahmand et al., "Brine leaching of lead-bearing zinc plant residues: Process optimization using orthogonal array design methodology," Hydrometallurgy, 95: 326 (2009).
Frías C. et al., "New Clean Technologies to Improve Lead-Acid Battery Recycling," Lead-Zinc 2000 Symposium, 791-801 (2000).

(Continued)

*Primary Examiner* — C Melissa Koslow
(74) *Attorney, Agent, or Firm* — Jenkins, Wilson, Taylor & Hunt, P.A.

(57) ABSTRACT

The present invention relates to a process for the selective and ecoefficient recovery of lead and silver jointly as a concentrate product from hydrometallurgical residues.

15 Claims, 1 Drawing Sheet

(56) References Cited

OTHER PUBLICATIONS

Frías, C. et al. "Tecnología Plint para tratamiento de residues de biolixiviación indirecta en el Proyecto Biomine," Rocas y Minerales, 54-59 (2008). (with explanation of relevance).
Frías, C. et al., "A new clean-lead factory for Europe," Workshop on environmentally Clean Technologies for Sustainable Production and Consumption at Vancouver (Canada), 2003.
Frías, C. et al., "A new concept clean-lead factory for Europe," Inner Workshop held in Madrid on 2004 of the Project Cleanlead with the Grant agreement ID: G1RD-CT-00481, financed by the Framework Programme for Research and Technological Development 5 (FP5-GROWTH), (2002-2004) by the European Union/European Commission, , Madrid (Spain), 2004.
Frías, C. et al., "Development of New-Concept Clean Technologies to Extract Metals from Primary and Secondary Sources," Environmental & Waste Management, 165-173 (2002).
Frías, C. et al., "Recovery of Precious Metals from Meallurgical Residues by Applying the PLINT Process," Chloride Meallurgy, 32nd Annual Hydrometallurgy Meeting, Montreal, (2002).
Velea, T. et al., "Recycling of Lead Batteries—New Concept", Proceedings of ASEM Conference EU/Asia S&T Cooperation on clean technologies, Hanoi, 291-296 (2004).
Zhang, Y. et al.; "Kinetics of simultaneous leaching of Ag and Pb from hydromeallurgical zinc residues by chloride", Rare Metals, 31: 4, 402-406 (2012).

\* cited by examiner

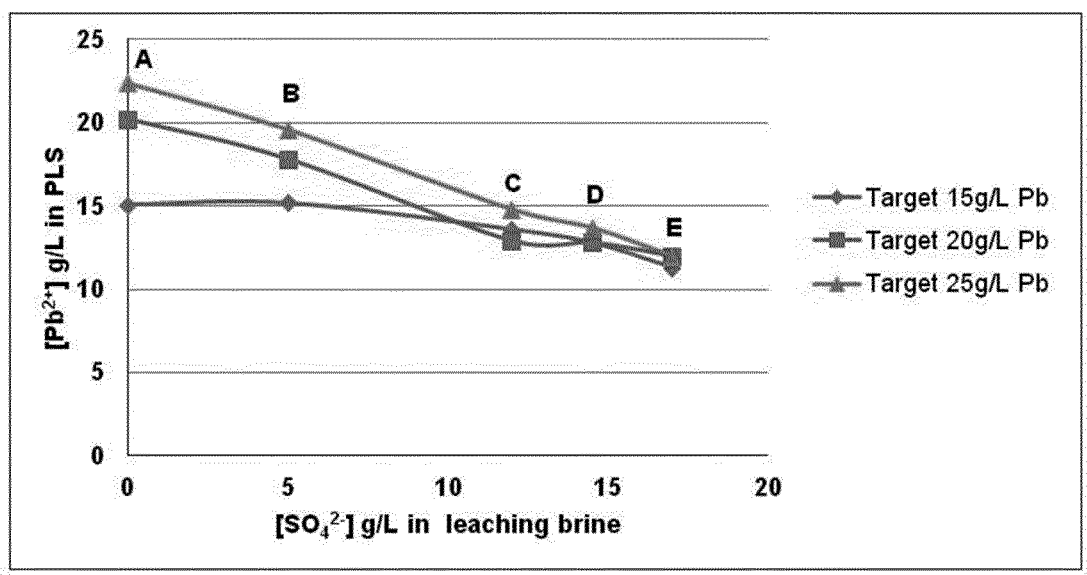

PROCESS FOR THE SELECTIVE RECOVERY OF LEAD AND SILVER

FIELD OF THE INVENTION

The present invention relates to a process for the selective and eco-efficient recovery of lead and silver jointly as a concentrate product from hydrometallurgical residues preferably from hydrometallurgical residues from electrolytic zinc plants.

BACKGROUND

Unlike other industrial revolutions from the past, any current technology to be innovative and competitive at the same time should take into account a number of aspects that are crucial due to the current social and political circumstances. These aspects are mainly: [i] A more rational use of raw materials; [ii] Prioritization of the recycling, reuse and recovery of industrial wastes and [iii] Minimizing the production of emissions.

In this sense, it is known that processing of minerals have severe effects on the environment not only for the large consumption of energy, water and chemicals but also because of the big quantities of waste products generated after these industrial activities. Such discarded materials are a source of toxic elements that may be problematic when fulfilling disposal specifications according to local legislations. However, the concern is not exclusively environmental, but economic as well. These waste materials can also be regarded as valuable new-generated raw materials because they are intrinsically generated in large quantities as by-products of existing industrial activities, and they are a rich source of valuable metals that have been concentrated as a result of the mineral process.

As a matter of fact nowadays, producing 1 ton of zinc generates 300 tons of leaching residues (Peng R. Q., *Metallurgy of Lead-Zinc, Science Press*, Beijing, 2003: 114; and Jiang J. M., *Chinese J. Nonferrous Metals*, 2004, 14(S1): 51). These leaching residues from electrolytic zinc plants contain high amounts of minor components such as lead, silver, gold and indium and their recovery could represent a substantial improvement in the profitability of a mining or metallurgical project as well as decreasing their environmental impact. This is due to the fact that after treatment of ores and concentrates through conventional extraction processes, the minor components such as lead and silver remain in the process residue. These residues typically assay 15-40% lead as lead sulphate and associated silver which for the most part are considered as unsuitable as feed for a conventional lead smelter except in small amounts.

In the past these leaching residues have been shipped to independent primary smelters for recovery of the metal values contained therein. The cost of shipping and processing the raw residue substantially detracts from the intrinsic value of the residue. For this reason, numerous processes are developed for the recovery of lead and silver from metallurgical residues. They are specially focused on metallurgical techniques, which can be either pyrometallurgical or hydrometallurgical routes (Zhang, Y. et al.; *Rare Metals*, 2012, 31: 4, 402-406).

In the case of pyrometallurgical processing, when such raw residues (mostly of a sulphated nature) are directly fed, there is high consumption of energy and emissions production. In addition only up to 10% of total silver is recovered, making this technique most of the time unsuitable, (Nakamura T. et al.; *Fundamentals of the pyrometallurgical treatment of zinc leach residue, Proc. 2nd International Symposium of Quality in Non-Ferrous Pyrometallurgical*. CIM, Montreal, 1995:341).

Regarding hydrometallurgical processing, Farahmand et al. (*Hydrometallurgy*, 2009, 95: 326) adopted brine leaching of lead-bearing zinc plant residues, wherein the extraction of lead is 89% but silver cannot be recovered. EP 0 042 702 B1 describes a method of leaching lead sulphate containing material in sodium chloride solution and after residue separation, precipitating the Pb from solution with milk of lime. However, the lead precipitates contain considerable amounts of chloride and sulphate and therefore are not acceptable to conventional lead smelters except in small amount and at depressed prices due to the deleterious effects of chlorides.

Within hydrometallurgical routes there have also been described processes wherein the lead is recovered by electrowinning from secondary materials (Frias C. et al.; *Lead-Zinc 2000 Symposium*, 791-801). Although electrowinning is generally acceptable for the extraction of valuable metals, the high capital cost of the electrolytic systems appear disadvantageous to established smelters when compared with the market price of lead.

Therefore, whilst these methods solve the problem of separating the lead but not always silver from hydrometallurgical residues there is also an additional difficulty in the recovery of the lead and silver from the solution in a usable form. Additionally, these processes are introduced to recover metals one by one, and thus requiring capital intensive equipment and therefore plant.

Consequently, there is a need to provide a process for the simultaneous extraction and recovery of lead and silver into the same product which will be acceptable to conventional lead smelters in high purity, large tonnages and at a premium price.

BRIEF DESCRIPTION OF THE INVENTION

The present process can be employed directly to selectively recover lead and silver from hydrometallurgical residues and valorise lead and silver into a marketable concentrate.

The authors of the present invention have shown that the leaching of hydrometallurgical residues using a chloride brine solution under oxidative conditions followed by the precipitation with a carbonate compound and by purification in the presence of a carbonate compound solution provides a concentrate with very high content of lead and silver and very low content of contaminants, particularly a very low content of chlorides, which is directly marketable to conventional lead smelters as a raw material of optimal quality and premium price.

Advantageously, lead and silver are recovered in only one concentrate in contrast to the processes described in the state of the art, thus providing an economically viable process which does not require high-cost equipment.

Therefore, the main aspect of the present invention refers to a process for the selective recovery of lead and silver, the process comprising the steps of:
  a) subjecting a hydrometallurgical residue comprising at least lead and silver to an oxidative leaching in the presence of a chloride brine solution and an oxidizing agent, thus selectively solubilizing lead and silver as chloride soluble compounds;
  b) reacting the pregnant leaching solution obtained in step a) with a carbonate compound which acts as precipitating agent, thus jointly precipitating lead and silver as a carbonate concentrate, and c) purifying the concentrate obtained in step b) by contacting said concentrate with a carbonate compound solution.

Another aspect of the present invention relates to a lead and silver carbonate concentrate obtainable according to the process as defined above.

DESCRIPTION OF THE DRAWINGS

FIG. 1 shows five lead concentration curves after oxidative leaching of the hydrometallurgical residue using different sulphate containing leaching brines and targeted final lead concentration in the resulting pregnant leaching solution.

DETAILED DESCRIPTION OF THE INVENTION

Unless defined otherwise, all technical and scientific terms used herein have the same meaning as commonly understood to one of ordinary skill in the art to which this disclosure belongs.

As mentioned before, the present invention relates to a new process for the selective recovery of lead and silver, the process comprising the steps of:

a) subjecting a hydrometallurgical residue comprising at least lead and silver to an oxidative leaching in the presence of a chloride brine solution and an oxidizing agent, thus selectively solubilizing lead and silver as chloride soluble compounds; and b) reacting the pregnant leaching solution obtained in step a) with a carbonate compound which acts as precipitating agent, thus jointly precipitating lead and silver as a carbonate concentrate; and c) purifying the concentrate obtained in step b) by contacting said concentrate with a carbonate compound solution.

The first step of the process of the invention (step a) as defined above requires a hydrometallurgical residue having at least a lead content and a silver content. In the context of the present invention, the hydrometallurgical residue refers preferably to a hydrometallurgical residue from electrolytic zinc plants where Special High Grade (SHG) Zinc is produced.

Examples of hydrometallurgical residues useful in the process of the invention include the residues from the processes of electrolytic zinc plants described in the European Patents EP 1 258 535 B1 and EP 1 361 296 B1.

In a preferred embodiment, the hydrometallurgical residue used in the step a) of the process as defined above, is a residue with a lead content between 10 and 40% weight with respect to the total residue dry weight and a silver content between 50 and 5000 ppm with respect to the total residue dry weight.

The hydrometallurgical residue is then subjected to an oxidative leaching in the presence of a chloride brine solution and an oxidizing agent, thus selectively solubilizing lead and silver as chloride soluble compounds.

The goal of this stage is to solubilize all the lead and silver content of the hydrometallurgical residue in a chloride brine medium, thus forming soluble complexes of lead and silver, according to the following chemical reactions:

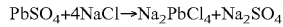

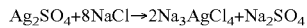

The term "chloride brine" refers to a solution of salt, usually sodium chloride, in water. It has been observed that a minimum chloride content of the leaching media is preferably required to assure the total solubilization of lead and silver, and therefore the maximum lead and silver leaching yields. Therefore, in a preferred embodiment, the chloride brine is a salt solution with a concentration of at least 4 mol/L, preferably between about 4 to about 6 mol/L, more preferably about 5 mol/L.

In a preferred embodiment, the chloride brine of step a) of the process as defined above is sodium chloride brine.

Elements and compounds that can also be present in the chemical matrix of the hydrometallurgical residue are for example calcium, potassium, magnesium, sodium, bismuth, aluminium, silicon, cadmium, arsenic, antimony, fluoride, chloride and sulphate. These impurities do not have any detrimental effect on the process efficiency except for the sulphate concentration which can have a negative effect on lead solubility from $PbSO_4$. It is well known in the state of the art that lead solubility depends on several factors being sulphate concentration in the chloride media and temperature the most relevant.

Therefore, in a preferred embodiment, the maximum sulphate concentration in the chloride media of the step a) of the process as defined above is less than 20 g/L, more preferably less than 5 g/L.

Regarding the temperature, it was detected that optimal operating temperature ranges are key issues in each of the steps of the process. These optimal ranges are defined later on for every step of the process.

The lead and silver contained in the hydrometallurgical residues are normally present as sulphates ($PbSO_4$ and $Ag_2SO_4$). However, a certain percentage of the associated silver in these residues can be present in other forms rather than sulphates such as $Ag_2S$, $Ag_2O$ or $AgCl$. If no oxidizing agent is added to the reaction media of the leaching step, silver dissolution is not complete. Therefore, the leaching step is run under oxidizing conditions in order to quantitatively leach the associated silver.

In a particular embodiment, the oxidizing agent of step a) of the process as defined above is sodium hypochlorite or hydrogen peroxide, more preferably sodium hypochlorite.

In another particular embodiment, the step a) of the process as defined above is further characterized in that it is operated at a Ag/AgCl redox potential between 100 and 350 mV, more preferably at 300 mV.

In another particular embodiment, the step a) of the process as defined above is further characterized in that it is operated at pH between 0.5 and 4, more preferably at a pH 4.

In a preferred embodiment, the step a) of the process as defined above is further characterized in that its pH is adjusted using hydrochloric acid or sulphuric acid.

In a preferred embodiment, the step a) of the process as defined above is further characterized in that it is operated at a temperature between 60 and 90° C., more preferably at 80° C.

In another particular embodiment, the step a) of the process as defined above is further characterized in that it is operated during a residence time between 1 and 6 hours, more preferably during 2 hours.

It is to be noted that after the leaching step, it is generated a pregnant leaching solution (PLS) containing the leached lead and silver, and a residue in the form of a cake that contains a minor content in lead. This solid can be easily disposed of as it presents a very low proportion of other toxic element in its composition.

In a preferred embodiment, the step a) of the process as defined above generates a pregnant leaching solution with a content of lead between 12 and 18 g/L and a silver content between 7.5 and 750 ppm.

Then, a PLS as defined above bearing all the lead and silver content from the hydrometallurgical residue feeds the following step, the precipitation step (step b)). Therefore, in the second step of the process of the invention (step b)) as defined above, the pregnant leaching solution obtained in step a) is reacted with a carbonate compound which acts as precipitating agent, thus jointly precipitating lead and silver as carbonates.

The goal of this stage is to completely precipitate lead and silver from the previously generated PLS so as to produce a lead and silver concentrate in a carbonate form.

In a particular embodiment, the step b) of the process as defined above is characterized in that it is operated at pH between 6 and 8, more preferably at a pH 7.5.

In a preferred embodiment, the pH is adjusted using the content of the carbonate compound.

The precipitating reaction can be conducted by adding the carbonate compound to the pregnant leaching solution, by adding the pregnant leaching solution over a solution of the carbonate compound or by adding both the pregnant leaching solution and the carbonate compound to a buffered solution.

However, in a preferred embodiment, the reaction takes place by adding the pregnant leaching solution over a solution of the carbonate compound, preferably an aqueous solution, or by adding both the pregnant leaching solution and the carbonate compound to a buffered solution.

Advantageously, by using these two alternatives in the precipitating step, along with the subsequent purification step, final products with a very low content of chloride contaminants are obtained. More particularly, final products having a content of chloride contaminants lower than 0.3% on the dry weight basis are obtained.

Even more preferably, the reaction carries out by adding both the pregnant leaching solution and the carbonate compound to a buffered solution.

In fact, as shown in the experimental section, the addition of the reactants to a buffered solution together with the subsequent purification step, provides a final product with the lowest content of chloride contaminants, preferably lower than 0.1% on its dry weight basis.

According to a preferred embodiment, the pH of the buffered solution is about 7 to 8, more preferably is about 7.5. More preferably, the buffered solution is a NaCl solution having a pH of 7.5.

In another preferred embodiment, the carbonate compound used as precipitating agent is step b) of the process of the invention is sodium carbonate as it also provides a precipitate having a lower content of chloride contaminants as can be also shown in the experimental section.

The precipitation in the form of carbonate takes place according to the following chemical equilibriums:

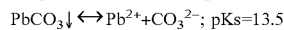

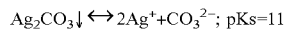

However, while lead precipitation in step b) is quantitative with the sole reaction with the carbonate compound, silver is not totally precipitated. According to this step, between 90 and 99% of the lead content present in the PLS obtained in step a) precipitates, whereas between 70 and 80% of the silver content present in said PLS precipitates.

Therefore, in a particular embodiment, the step b) of the process as defined above further comprises the addition of an additional precipitating agent or a cementating agent to the resulting solution obtained after reacting the carbonate compound with the pregnant leaching solution. The addition of this additional precipitating or cementating agent allows the precipitation of the remaining silver.

In the present invention, a precipitating agent and a cementing agent could be used as precipitant. The term "precipitating agent" refers to the chemical that causes the formation of a solid without modifying the oxidation state of the starting material from which the solid is form, whereas "cementating agent" refers to the chemical that causes the formation of a solid by modifying the oxidation state of the starting material from which the solid is form.

In a preferred embodiment, the additional precipitating agent is selected from sodium sulphide and sodium hydrosulphide. More preferably, the additional precipitating agent is sodium sulphide. Even more preferably, between 30 and 150 excess over stoichiometric amounts of sulphide in the form of sodium sulphide are added, thus precipitating the remaining silver according to the following reaction

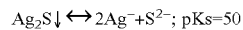

In another preferred embodiment, the cementating agent is metallic lead powder. More preferably, between 1 and 3 g/L of metallic lead powder are added, thus precipitating the remaining silver.

With the addition of the supplementary precipitating or cementating agent, between 75 and 99% of the silver content present in the PLS of step a) precipitates, more preferably 80 and 99%, even more preferably 99% of the silver content.

In another particular embodiment, the step b) of the process as defined above is further characterized in that it is operated at a temperature between 40 and 80° C., more preferably at 60° C.

In another particular embodiment, the step b) of the process as defined above is further characterized in that it is operated during a residence time between 1 and 4 hours, more preferably during 1 hour.

Since the process of the invention is operated in a chloride brine media, most detrimental contaminants of the lead and silver precipitates are chloride containing chemical species. The chloride contamination sources are identified as:
  Chloride species corresponding to the soaking leaching/precipitation brine such as NaCl, KCl, CaCl$_2$ and Na$_2$PbCl$_4$/Na$_3$AgCl$_4$. These chloride species are easily solubilized and removed by re-pulping the Pb/Ag precipitate with water, heating the pulp between 60 and 80° C.
  Chlorides corresponding to chemical species that co-precipitate with Pb and Ag carbonates such as PbClOH, Pb$_2$Cl$_2$CO$_3$ or the like. These species are considered "insoluble chloride species". In order to purify PbCO$_3$ from these compounds, while not losing any lead, these species may be transformed into lead hydroxides, lead oxides or lead carbonates.

Therefore, the process of the invention is further characterized in that it comprises a step c) of purifying the precipitate obtained in step b) by contacting said precipitate with an aqueous solution of a carbonate compound to reduce the content of contaminants from the final lead and silver concentrate product.

As stated previously, the goal of the purification stage (step c) of the process as defined above) is to reduce the contaminants content as much as possible, particularly the total content of chlorides, so that a marketable lead and silver carbonate is produced.

However, it should be point out that the purity of the final product, and in particular the content of chloride contaminants, not only relies on the final purification step but also in the combination of the three steps of the process of the invention. As mentioned before, and as shown in the experimental section, the conditions where the oxidative leaching and the precipitation take place also have an influence on the purity of the final product.

In a preferred embodiment, the carbonate compound used in step c) is sodium carbonate. In such case, it is proposed that the following chemical reaction takes place:

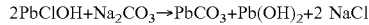
2PbClOH+Na$_2$CO$_3$→PbCO$_3$+Pb(OH)$_2$+2 NaCl

In another particular embodiment, the step c) of the process as defined above is further characterized in that it is operated at a temperature between 40 and 90° C., more preferably at 80° C.

In another particular embodiment, the step c) of the process as defined above is further characterized in that it is operated during a residence time between 1 and 6 hours, more preferably during 1 hour.

In another particular embodiment, the step c) of the process as defined above is further characterized in that it is run consecutively between 2 and 5 times, more preferably twice.

Another aspect of the present invention relates to a lead and silver carbonate concentrate obtainable according to the process as defined above.

As mentioned before and as pointed out in the experimental section, the process of the invention provides a final concentrate with a very high content of lead and silver and a very low content of contaminants, particularly a very low content of chlorides ranging from 0.01 to 0.5%, preferably from 0.01 to 0.3%, more preferably from 0.01 to 0.2%, even more preferably from 0.01 to 0.1% on its dry weight basis.

Therefore, in a particular embodiment, the lead and silver carbonate concentrate as defined above, is further characterized in that it comprises a chloride content between 0.01 and 0.5% on its dry weight basis.

Preferably, the lead and silver carbonate concentrate of the invention is characterized in that it comprises a chloride content between 0.01 and 0.3%, more preferably from 0.01 to 0.2%, even more preferably from 0.01 to 0.1% on its dry weight basis.

EXAMPLES

The present invention will now be described by way of examples which serve to illustrate the construction and testing of illustrative embodiments. However, it will be understood that the present invention is in no way limited to the examples set forth below.

Example 1

Continuous Large Scale Operation of the Process of the Invention 1.1. Step a)—Oxidative Leaching A sample of hydrometallurgical residue generated from an electrolytic zinc process and assaying a composition according to Table 1 is processed according to the invention.

| Element | Unit | Composition |
|---------|------|-------------|
| Pb | % | 10-40 |
| Ag | ppm | 50-5000 |
| Zn | % | 1-10 |
| Fe | % | 5-25 |
| Cu | % | 0.1-10 |

The residue was then leached in a leaching reactor arranged in a cascade mode and fed with a sodium chloride brine solution with a concentration of 159 g/L, a sodium hypochlorite solution and sulphuric acid to meet operational parameters (redox potential at 300 mV and pH 4). The leach residue was conducted at 80° C. for 2 hours.

The leaching generated a residue which was allowed to settle, then filtered and disposed of, and a pregnant leaching solution containing the leached lead and silver. The PLS composition is shown in Table 2. A leaching efficiency of 99% for lead and silver was obtained.

TABLE 2

| Element | Unit | Concentration |
|---------|------|---------------|
| Pb | g/L | 12-18 |
| Ag | ppm | 7.5-750 |
| Zn | g/L | 0.7-1 |
| Fe | ppm | 4-20 |
| Cu | g/L | 0.1-2 |
| Ca | g/L | 0.3-0.5 |
| Na | g/L | 80-90 |
| Mg | g/L | 2-4 |
| K | g/L | 25-30 |
| Si | ppm | 10-30 |
| SO4 | g/L | 14-17 |
| Cl | g/L | 150-160 |
| F | ppm | 10-30 |

1.2. Step b)—Precipitation Stage

The PLS of the step a) was treated in precipitating reactors arranged in a cascade mode and fed with sodium carbonate, so as to meet the operational parameter of pH 7.5. Namely, the PLS of step a) and a solution of sodium carbonate (60-200 g/L) are added to a NaCl buffered solution having a pH of 7.5. The temperature and reaction time were 60° C. and 1 hour. At the end of the reaction, an additional precipitating agent, sodium sulphide, was added to totally precipitate the remaining silver.

The precipitation step generated a concentrate containing the precipitated lead and silver as carbonates. Precipitates were allowed to settle and the thickened precipitate filtered. An efficiency of 99% for lead and silver was obtained.

1.3. Step c)—Purification Stage

The concentrate of the step b) was washed with a stoichiometric amount of a sodium carbonate solution. The temperature and reaction time were 80° C. and 1 hour, respectively. The process was repeated.

The purification generated a free chloride concentrate containing the precipitated lead and silver.

The following table summarizes the main composition of some representative final lead and silver concentrates produced by means of the process of the invention under the conditions described in steps a)-c).

TABLE 3

| Product | Pb (%) | Ag (ppm) | Cl (%) | CO$_3$ (%) | Cu(%) | Zn (%) |
|---------|--------|----------|--------|------------|-------|--------|
| Sample 1 | 74 | 1703 | 0.01 | 19 | 0.5 | 1.8 |
| Sample 2 | 72 | 1622 | 0.05 | 25 | 0.4 | 1.2 |
| Sample 3 | 71 | 1681 | 0.03 | 23 | 0.4 | 1.0 |
| Sample 4 | 74 | 1633 | 0.09 | 23 | 0.4 | 0.2 |
| Sample 5 | 72 | 1700 | 0.03 | 24 | 0.4 | 0.8 |
| Sample 6 | 69 | 1760 | 0.19 | 24 | 0.7 | 2.7 |

As can be seen, the combination of all steps of the process as defined in the invention provides a final concentrate with a very low content of chloride contaminants.

Table 4 summarizes the most relevant results from a continuous large scale operation of the process of the invention.

TABLE 4

| Process step | Yields (%) | | Time (h) | Consumptions | |
|---|---|---|---|---|---|
| Oxidative leaching | Pb yield 95-99 | Ag yield 95-99 | 105 | $H_2SO_4$ 20-30 g/Kg dried residue | NaClO 20-30 g/Kg dried residue |
| Precipitation | Pb yield 95-99 | Ag yield 70-99 | 105 | $Na_2CO_3$ 300-700 g/Kg Pb | $Na_2S$ 30-60 g/Kg Pb |
| Purification | Cl removal yield 95-99 | | 45 | $Na_2CO_3$ 0.1-0.2 Kg/Kg Pb | |

Example 2

Monitorization of the Influence of Impurities in the Oxidative Leaching of Lead

In order to evaluate the effect of the impurities in the leaching efficiency of lead several tests were performed. The focus of these experiments was on sulphate anions as it is known to have a negative effect on lead dissolution from $PbSO_4$.

Several leaching tests (#1-7) were performed over a hydrometallurgical residue monitoring the effect of $SO_4$, Mg, Si, F, K and Ca on the leaching efficiency of a 4.5 NaCl M solution. The results of these tests are summarized in Table 5 showing that impurities such as Mg, Si, F, K and Ca do not have a detrimental effect on lead leaching (#1) whereas the sulphate concentration in the brine provides a lower leaching efficiency when it is over 5 g/L (#2-7).

TABLE 5

| | LEACHING TESTS | | | | | | |
|---|---|---|---|---|---|---|---|
| | #1 | #2 | #3 | #4 | #5 | #6 | #7 |
| OPERATING CONDITIONS Leaching Media Brine: | | | | | | | |
| NaCl (M) | 4.5 | 4.5 | 4.5 | 4.5 | 4.5 | 4.5 | 4.5 |
| $[SO_4^{2-}]$ (g/L) | 0 | 5 | 5 | 5 | 7.5 | 10 | 15 |
| Impurities (Yes/No) | Yes | No | Yes | Yes | Yes | Yes | Yes |
| pH | 4 | 4 | 4 | 4 | 4 | 4 | 4 |
| Residence time (h) | 2 | 2 | 2 | 2 | 2 | 2 | 2 |
| T (° C.) | 80 | 80 | 80 | 80 | 80 | 80 | 80 |
| Oxidant | NO | NO | NO | NO | NO | NO | NO |
| RESULTS PLS: | | | | | | | |
| Pb (g/L) | 17 | 13.4 | 15.6 | 15.5 | 14.5 | 11.6 | 8.59 |
| Ag (g/L) | 0.012 | 0.007 | 0.01 | 0.013 | 0.011 | 0.012 | 0.011 |
| Zn (g/L) | 1.51 | 0.312 | 0.323 | 0.353 | 1.08 | 1.44 | 2.35 |
| Residue: | | | | | | | |
| Pb (%) | 1.35 | 0.446 | 0.512 | 0.737 | 1.72 | 1.96 | 4.9 |
| Ag (ppm) | 26 | 47 | 41 | 33 | 44 | 28 | 37 |
| Zn (%) | 13.7 | 13.3 | 13.2 | 13.1 | 12.3 | 13.3 | 12.6 |
| Leaching Efficiencies: | | | | | | | |
| Pb (%) | 95 | 98 | 98 | 98 | 94 | 93 | 82 |
| Ag (%) | 89 | 82 | 82 | 87 | 82 | 88 | 82 |
| Zn (%) | 18 | 5 | 3 | 6 | 10 | 19 | 15 |

Example 3

Monitorization of the Influence of Chloride Content in the Leaching Brine

Once the best sulphate concentration was established for the leaching brine, some experiments (tests #8-1) were performed to establish the optimal chloride content to guarantee maximum Pb and Ag leaching yields.

TABLE 6

| | LEACHING TESTS | | | | | |
|---|---|---|---|---|---|---|
| | #8 | #9 | #10 | #11 | #12 | #13 |
| OPERATING CONDITIONS | | | | | | |
| Leaching Media Brine: | | | | | | |
| NaCl (M) | 4.2 | 4.4 | 4.5 | 4.6 | 4.8 | 5 |
| [Cl] (g/L) | 150 | 155 | 159 | 162 | 170 | 176 |
| [$SO_4^{2-}$] (g/L) | 5 | 5 | 5 | 5 | 5 | 5 |
| Impurities (Yes/No) | Yes | Yes | Yes | Yes | Yes | Yes |
| pH | 4 | 4 | 4 | 4 | 4 | 4 |
| Residence time (h) | 2 | 2 | 2 | 2 | 2 | 2 |
| T (° C.) | 80 | 80 | 80 | 80 | 80 | 80 |
| Oxidant (500 mV) | NaClO | NaClO | NaClO | NaClO | NaClO | NaClO |
| RESULTS | | | | | | |
| Leaching Efficiencies: | | | | | | |
| Pb (%) | 97.73 | 97.91 | 97.73 | 98.05 | 98.19 | 98.4 |
| Ag (%) | 99.5 | 99.60 | 99.60 | 99.60 | 98.04 | 99.8 |

In agreement with the results from Table 6, it can be derived that it is preferably required a minimum chloride content of the leaching media to assure total solubilization of lead and silver.

Example 4

Optimization of the Oxidizing Potential During the Oxidative Leaching Step (Step a))

The following examples summarized in Table 7 illustrate that for a complete dissolution of silver from the hydrometallurgical residue it is necessary to perform the leaching step under oxidizing conditions.

It can be derived from tests #14-21 that if no oxidant is added to the reaction media, silver dissolution is not complete. On the other hand, it was detected that silver total dissolution can be achieved when the reaction media is kept in an oxidizing redox potential.

Example 5

Study of the Optimal Operational Lead Concentration

It was also evaluated the optimal lead concentration in the PLS to be produced during the leaching stage. For these

TABLE 7

| | LEACHING TESTS | | | | | | | |
|---|---|---|---|---|---|---|---|---|
| | #14 | #15 | #16 | #17 | #18 | #19 | #20 | #21 |
| OPERATING CONDITIONS | | | | | | | | |
| Leaching Media Brine: | | | | | | | | |
| Cl (g/L) | 159 | 159 | 159 | 159 | 159 | 159 | 159 | 159 |
| [$SO_4^{2-}$] (g/L) | 5 | 5 | 5 | 5 | 5 | 5 | 5 | 5 |
| Impurities (Yes/No) | Yes | Yes | Yes | Yes | Yes | Yes | Yes | Yes |
| pH | 4 | 4 | 4 | 4 | 4 | 4 | 4 | 4 |
| Residence time (h) | 2 | 2 | 2 | 2 | 2 | 2 | 2 | 2 |
| T (° C.) | 80 | 80 | 80 | 80 | 80 | 80 | 80 | 80 |
| Oxidant | 0 | 0 | NaClO | NaClO | NaClO | NaClO | NaClO | NaClO |
| mV (Ag/AgCl) | 122 | 113 | 150 | 200 | 200 | 250 | 300 | 350 |
| RESULTS | | | | | | | | |
| Leaching Efficiencies: | | | | | | | | |
| Pb (%) | 99 | 99 | 97 | 98 | 98 | 97 | 98 | 98 |
| Ag (%) | 75 | 63 | 80 | 96 | 98 | 98 | 99 | 99 | purpose several leaching tests (#22-36) were performed on a hydrometallurgical residue varying:
the lead concentration target to be achieved, and
the sulphate concentration of the leaching chloride brine.
FIG. 1 summarizes the obtained results. According to FIG. 1, targeted lead concentrations of 20 and 15 g/L are obtained. Nevertheless, it is observed that the higher the sulphate content of the leaching brine, the higher the deviation to the targeted lead concentration.

Example 6

Pregnant Liquor Solution Characterization

This example corresponds to a leaching test (#37) over a hydrometallurgical residue where a complete characterization of the Pregnant Liquor Solution (PLS) was made (Table 2).

TABLE 8

|  | LEACHING TEST #37 |
|---|---|
| OPERATING CONDITIONS | |
| Leaching Media Brine: | |
| Cl (g/L) | 159 |
| [SO$_4^{2-}$] (g/L) | 5 |
| Impurities (Yes/No) | Yes |
| pH | 4 |
| Residence time (h) | 2 |
| T (° C.) | 80 |
| Oxidant | NaClO |
| mV (Ag/AgCl) | 300 |
| RESULTS | |
| Leaching Efficiencies: | |
| Pb (%) | 99 |
| Ag (%) | 99 |

Example 7

Precipitation Tests

For a total recovery of both lead and silver from the PLS in a carbonate form it is preferably required to add an additional reagent to completely recover silver. Several precipitation tests were performed (#38-40) using different reagents. Results are summarized in Table 9.

TABLE 9

| PRECIPITATION TESTS | Reagent | % Pb Prec. | % Ag Prec. |
|---|---|---|---|
| #38 | NaHS | 99 | 99 |
| #39 | Na$_2$S | 99 | 99 |
| #40 | Metallic Lead powder | 98 | 99 |

Example 8

Study of the Optimal Dose for Silver Recovery Agents

To optimize the dose of either Na$_2$S as silver precipitating agent and metallic lead powder as silver cementating agent several tests were performed (#41-48).

A series of precipitation tests were performed under the previously described precipitation stage conditions (Example 1.2) varying the Na$_2$S dose in the reaction media according to the following reaction:

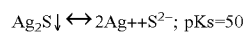
$$Ag_2S\downarrow \leftrightarrow 2Ag^+ + S^{2-}; \quad pKs=50$$

Na$_2$S addition was assayed in relation to the theoretical stoichiometric dose of the previous chemical equilibrium.

TABLE 10

| PRECIPITATION TESTS | Na$_2$CO$_3$ addition | Na$_2$S dose (times stoichio.) | % Pb Prep. | % Ag Prep. |
|---|---|---|---|---|
| #41 | pH 7.5 | ×30 | 99 | 77 |
| #42 | pH 7.5 | ×50 | 98 | 98 |
| #43 | pH 7.5 | ×150 | 99 | 99 |

It can be derived from tests #41-43 that a stoichiometric ratio of Na$_2$S over silver between 30 and 150 is preferably required to recover the remaining silver in the precipitation stage.

Additionally, a total of five precipitation tests (#44-48) were performed to optimize metallic lead powder addition as a cementating reagent to recover silver in the precipitation stage. These tests were run under conditions previously described (Example 1.2).

TABLE 11

| PRECIPITATION TESTS | Na$_2$CO$_3$ addition | Pb$^0$ addition | Pb$^0$ dose | % Pb Prep. | % Ag Prep. |
|---|---|---|---|---|---|
| #44 | First 45' | Last 15' | 1 g/L | 99 | 85 |
| #45 | First 30' | Last 30' | 1 g/L | 99 | 92 |
| #46 | Last 30' | First 30' | 1 g/L | 98 | 76 |
| #47 | First 30' | Last 30' | 2 g/L | 98 | 95 |
| #48 | First 30' | Last 30' | 3 g/L | 99 | 99 |

It can be derived from tests #44-48 that between 1 and 3 g/L of metallic lead powder are preferably required to recover the remaining silver in the precipitation stage.

Example 9

Tests for Determining Optimal Purification Conditions

Several tests were performed in order to address the optimal conditions for the purification stage (#49-57). These tests were devoted to monitor the effect of:
Temperature;
Number of stages;
Na$_2$CO$_3$ dose.
The purification tests were conducted starting from concentrates obtained following steps a) and b) of example 1.

TABLE 12

| PURIFIC. TESTS | Feed Cl** (%) | N° Stages | Operating conditions Temperature | Time | Na₂CO₃ dose* | Product Cl** (%) |
|---|---|---|---|---|---|---|
| #49 | 5.17 | 1 | 80° C. | 1 h | 0x | 0-0.5 |
| #50 | | 1 | 80° C. | 3 h | 1x | 0-0.3 |
| #51 | | 1 | 25° C. | 3 h | 1x | 0-1 |
| #52 | | 1 | 60° C. | 3 h | 1x | 0-0.5 |
| #53 | | 1 | 60° C. | 3 h | 1.5x | 0-0.5 |
| #54 | | 1 | 60° C. | 3 h | 0.5x | 0-0.5 |
| #55 | | 2 | 80° C./80° C. | 1 h + 1 h | 1x | 0-0.3 |
| #56 | | 3 | 60° C./35° C./30° C. | 3 h + 3 h + 3 h | 1x | 0-0.5 |
| #57 | | 3 | 60° C./60° C./60° C. | 3 h + 3 h + 3 h | 0.5x/1x/2x | 0-0.3 |

*According to the chemical reaction: 2 PbClOH + Na₂CO3 →PbCO₃ + Pb(OH)₂ + 2 NaCl and assuming that all chloride is in the form of PbClOH.
**weight dry basis In agreement with the results showed in Table 12, the optimal operating conditions for the purification stage for a quantitative depletion of chloride contaminants from the lead and silver precipitation product are:

Temperature preferably 80° C.;
Residence time preferably 1 hour per stage;
Number of stages preferably 2; and
Addition of Na₂CO3 between 0.5 and 2 stoichiometric times.

Example 10

Tests for Determining Optimal Precipitating Conditions

Due to the fact that the main source of chloride contaminants comes from the presence of PbClOH which is generated in the precipitation step b), some experimental assays were conducted in order to reduce as much as possible the production of this specie.

1) Effect of Precipitating Agent

Two precipitating agents were used in step b): $Na_2CO_3$ and $NaHCO_3$.

The assays were conducted carrying out the precipitation step by adding the solution of the carbonate compound and the PLS to a buffered solution having a pH of 7.5. The results are shown in table 13 below:

TABLE 13

| Precipitation Test | Precipitation step Features | Intermediate cake Cl % | Purification Test | Purified Product Cl % |
|---|---|---|---|---|
| #58 | Buffered solution pH 7.5 and Na₂CO₃ addition | 6 | #60 | 0.149 |
| #59 | Buffered solution pH 7.5 and NaHCO₃ addition | 15 | #61 | 1.8 |

As can be seen, the use of carbonate sodium provides less content of chlorides after the precipitation and purification steps. It has been hypothesized that contamination by PbClOH could be directly related to the hydroxyl content existing in the precipitating reaction media. The most content of [OH⁻] the most likely that OH⁻ bonds to Pb forming PbClOH. In view of these results, it seems that the equilibrium involved in the hydrolysis of NaHCO₃ provides more content of OH⁻ ions which are incorporated to PbClOH, thus producing more chloride contaminants.

2) Effect of the Order of Addition of Reactants During the Precipitation Step

Several tests were performed in order to assess the effect of the order of addition of reactants during the precipitation step.

The following conditions were used:
content of $Pb^{21}$ in the PLS: 12-15 g/L;
$CO_3^{2-}$ source: solution of $Na_2CO_3$ (60-204 g/L)
brine solution: 160 g/L of Cl⁻; 300 mV (Ag/AgCl); pH=4

Case 1

In this example, the pregnant leaching solution is added to the Na₂CO₃ solution.

The addition of the pregnant leaching solution decreases gradually the pH from 11 to 7.5 while precipitating PbCO₃ and other species such as Pb(OH)₂ and PbClOH.

The obtained precipitate was then subjected to a purification step by contacting said concentrate with a sodium carbonate solution. The results are shown in table 15:

TABLE 15

| | PRECIPITATION | | | | PURIFICATION | |
|---|---|---|---|---|---|---|
| Test | Na2CO3 g/L | pH profile | Na2CO3 Kg/Kg Pb | Cl (%) | Test | Cl (%) |
| #62 | 60 | 11-7.5 | 0.639 | 3.16 | #66 | 0.3 |
| #63 | | 10.8-7.21 | 0.698 | 3.27 | #67 | 0.193 |
| #64 | | 11.01-7.55 | 0.610 | 10.8 | #68 | <0.050 |
| #65 | | 10.76-7.53 | 0.626 | 6.52 | #69 | 0.034 |

These results point out that the addition of the pregnant leaching solution to a solution of the carbonate compound provides good results as a precipitate having a final chloride content lower than 0.3% is obtained.

Case 3

In this example, the precipitating agent (the solution of Na₂CO₃) and the pregnant leaching solution are added to a buffered solution consisting of a brine solution having a pH of 7.5.

The obtained precipitate was then subjected to a purification step by contacting said concentrate with a sodium carbonate solution. The results are shown in table 16:

TABLE 16

| | PRECIPITATION | | | | PURIFICATION | |
|---|---|---|---|---|---|---|
| Test | [Na2CO3] g/L | pH profile | Na2CO3 Kg/Kg Pb | Cl (%) | Test | Cl (%) |
| #70 | 135 | 8.21-7.2-7.69 | 0.573 | 5.09 | #75 | <0.01 |
| #71 | | 7.47-7.66-7.89 | 0.619 | 6.12 | #76 | 0.05 |
| #72 | | 7.21-7.49-7.59 | 0.597 | 6.6 | #77 | 0.034 |
| #73 | 204 | 7.86-7.28-7.41 | 0.673 | 5.78 | #78 | 0.026 |

The results point out that when the precipitation step is conducted in a buffered solution so as pH is fixed and does not vary from 4 to 7.5 or from 11 to 7.5, the incorporation of $OH^-$ ions to the final product in the form of PbClOH is much lower, thus obtaining a final product with lower content of chlorides as lower insoluble chlorides have to be purified.

The invention claimed is:

1. A process for the selective recovery of lead and silver, the process comprising the steps of:
    a) subjecting a hydrometallurgical residue comprising at least lead and silver to an oxidative leaching in the presence of a chloride brine solution and an oxidizing agent, thus selectively solubilizing lead and silver as chloride soluble compounds;
    b) reacting the pregnant leaching solution obtained in step a) with a carbonate compound which acts as a precipitating agent, thus jointly precipitating lead and silver as carbonate concentrate; and
    c) purifying the concentrate obtained in step b) by contacting said concentrate with a carbonate compound solution, so as a lead and silver carbonate concentrate having a chloride content between 0.01 and 0.3 wt % on a dry weight basis is obtained.

2. The process according to claim 1, wherein the hydrometallurgical residue of step a) is a residue with a lead content between 10 and 40% weight with respect to the total residue dry weight and a silver content between 50 and 5000 ppm with respect to the total residue weight.

3. The process according to claim 1, wherein the chloride brine of step a) is sodium chloride brine.

4. The process according to claim 1, wherein the oxidizing agent of step a) is sodium hypochlorite.

5. The process according to claim 1, wherein the step a) is operated at Ag/AgCl redox potential between 100 and 350 mV.

6. The process according to claim 1, wherein the step a) is operated at a pH between 0.5 and 4.

7. The process according to claim 1, wherein the precipitating agent of step b) is sodium carbonate.

8. The process according to claim 1, wherein step b) is conducted by adding the pregnant leaching solution obtained in step a) and a solution containing the carbonate compound to a buffered solution.

9. The process according to claim 1, wherein step b) further comprises the addition of an additional precipitating agent or a cementating agent to the resulting solution obtained after reacting the carbonate compound with the pregnant leaching solution.

10. The process according to claim 9, wherein the additional precipitating agent is selected from sodium sulphide and sodium hydrosulphide.

11. The process according to claim 9, wherein the cementating agent is metallic lead powder.

12. The process according to claim 1, wherein the step b) is operated at a pH between 6 and 8.

13. The process according to claim 1, wherein the carbonate compound of step c) is sodium carbonate.

14. A lead and silver carbonate concentrate obtained by the process of claim 1, wherein the concentrate comprises a lead content between 69 and 74 wt %. a silver content between 1622 and 1760 ppm, a chloride content between 0.01 and 0.19 wt %, a carbonate content between 19 and 25 wt %, a copper content between 0.4 and 0.7 wt % and a zinc content between 0.2 and 2.7 wt % on a dry weight basis.

15. The lead and silver carbonate concentrate according to claim 14, wherein its main composition is selected from the following:
    a lead content of 74 wt %, a silver content of 1703 ppm, a chloride content of 0.01 wt %, a carbonate content of 19 wt %, a copper content of 0.5 wt % and a zinc content of 1.8 wt %;
    a lead content of 72 wt %, a silver content of 1622 ppm, a chloride content of 0.05 wt %, a carbonate content of 25 wt %, a copper content of 0.4 wt % and a zinc content of 1.2 wt %;
    a lead content of 71 wt %, a silver content of 1681 ppm, a chloride content of 0.03 wt %, a carbonate content of 23 wt %, a copper content of 0.4 wt % and a zinc content of 1.0 wt %;
    a lead content of 74 wt %, a silver content of 1633 ppm, a chloride content of 0.09 wt %, a carbonate content of 23 wt %, a copper content of 0.4 wt % and a zinc content of 0.2 wt %;
    a lead content of 72 wt %, a silver content of 1700 ppm, a chloride content of 0.03 wt %, a carbonate content of 24 wt %, a copper content of 0.4 wt % and a zinc content of 0.8 wt %; and
    a lead content of 69 wt %, a silver content of 1760 ppm, a chloride content of 0.19 wt %, a carbonate content of 24 wt %, a copper content of 0.7 wt % and a zinc content of 2.7 wt %.

* * * * *